(12) United States Patent
Chang et al.

(10) Patent No.: US 6,731,855 B2
(45) Date of Patent: May 4, 2004

(54) VARIABLE OPTICAL ATTENUATOR

(75) Inventors: Chih Chiang Chang, Tu-Chen (TW); Yao-Hao Chang, Tu-Chen (TW); Kun-Tsan Wu, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 10 days.

(21) Appl. No.: 10/085,393

(22) Filed: Feb. 27, 2002

(65) Prior Publication Data

US 2003/0095778 A1 May 22, 2003

(30) Foreign Application Priority Data

Nov. 21, 2001 (TW) ........................................ 90220074 U

(51) Int. Cl.[7] .................................................. G02B 6/00
(52) U.S. Cl. ............................ 385/140; 385/31; 385/47; 359/280
(58) Field of Search ............................... 385/16, 20, 21, 385/22, 23, 31, 140

(56) References Cited

U.S. PATENT DOCUMENTS

| 5,276,747 | A | * | 1/1994 | Pan ............................. 385/34 |
|---|---|---|---|---|
| 5,315,431 | A | * | 5/1994 | Masuda et al. .............. 359/281 |
| 6,023,542 | A | * | 2/2000 | Pan et al. ...................... 385/24 |
| 6,055,104 | A | * | 4/2000 | Cheng .......................... 359/495 |
| 6,181,846 | B1 | * | 1/2001 | Pan ............................... 385/18 |
| 6,195,479 | B1 | * | 2/2001 | Pan ............................... 385/18 |
| 6,198,567 | B1 | * | 3/2001 | Bergmann ................... 359/281 |
| 6,266,474 | B1 | * | 7/2001 | Han et al. .................... 385/140 |
| 6,441,944 | B1 | * | 8/2002 | Kim et al. ................... 359/281 |
| 6,483,982 | B1 | * | 11/2002 | Takahashi .................... 385/140 |

* cited by examiner

Primary Examiner—Phan T. H. Palmer
Assistant Examiner—Jennifer Doan
(74) Attorney, Agent, or Firm—Wei Te Chung

(57) ABSTRACT

A variable optical attenuator (99) comprises a holder (4), a rotatable mechanism (5), a refractor (6), an input port (2) and an output port (3). The input port and the output port are engaged with corresponding upright beams (42, 43) of the holder, which hold the input port and the output port in alignment with each other. The refractor is mounted on the rotatable mechanism by adhering to or soldering on a groove (52) of the rotatable mechanism, wherein the rotatable mechanism mates with a through hole (46) of the holder to make the center of the refractor and the optical axis of input and output collimators (22, 32) of the input and output ports in line.

15 Claims, 5 Drawing Sheets

VARIABLE OPTICAL ATTENUATOR

BACKGROUND OF THE INVENTION

1. Field of the Invention

The present invention relates to a variable attenuator for use in optical fiber communication and optical network technology, and particularly to a variable attenuator with a rotatable refractor between an input fiber and an output fiber to realize a variable attenuation of optical power.

2. Description of Related Art

A fiber optic attenuator is a passive optical component for reducing optical power propogating in a fiber, and may perform fixed or variable attenuation, which allows high power transmission signals to be processed directly into signal application apparatus. Optical attenuators are widely used in optical transmission systems and optical networks.

Means for providing fixed attenuation are well known in the art, which generally utilize a medium of fixed optical density disposed between a signal input fiber and a signal output fiber. These media can comprise isolated material placed between the signal carrying fibers, or can comprise a coating upon the terminal end of at least one of the signal carrying fibers.

In the past, variable attenuators have reduced signal levels by transmitting such signals through partially opaque optical filters, by obstructing a section of the signal with attenuation filter segments, by varying the orientation between signal input and output fibers, or by diminishing signal strength via reflecting from partially light absorbent elements.

For example, U.S. Pat. No. 4,591,231 describes an optical attenuator containing a disk having a plurality of openings with fixed, neutral density filters of differing optical density contained therein. By rotating the disk, a fixed density filter of a desired opacity can be introduced into the signal path, thereby attenuating a portion of the signal. Although effective for reducing signal strength, such a system is limited in that attenuation levels vary in a step-wise rather than a continuous manner.

U.S. Pat. No. 4,938,989 discloses another variable attenuator. As shown in FIG. 6, such attenuator 100 comprises a housing 150 containing a first optical fiber connector 140, a first optical lens 160, a first connecting optical fiber 180, a second optical lens 200 separated from the first optical lens 160 by an optical coupling region, a second optical fiber connector 220, a second connecting optical fiber 240, an optical filter 260 and a reciprocating means 280. The optical filter 260 is a flexible film having an optical density gradient varying along its length, which is mounted in an orientation substantially orthogonal to the optical axis within the optical coupling space between each of lenses 160 and 200. The filter 260 is operably connected to the reciprocating means 280 to vary the vertical position of the filter 260. As the density of the filter 260 is a gradient along its length, such vertical movement serves to provide areas or regions of differing optical density that transmits and absorbs differing amounts of light, thereby providing a continuously variable filter means between the lenses 160 and 200. In this application, the design and the manufacture of the filter are difficult and complex, making the cost of the attenuator high.

It is desirable to provide a variable attenuator for overcoming the above problems.

BRIEF SUMMARY OF THE INVENTION

An object of the present invention is to provide an improved variable attenuator having a refractor that is used for reducing optical transmission signals in a continuous manner.

Another object of the present invention is to provide a simple and low-cost variable attenuator that is easy to operate.

To achieve the above objects, in accordance with the present invention, a variable optical attenuator of the present invention comprises a holder, a rotatable mechanism, a refractor, an input port and an output port. The input port and the output port are engaged with corresponding upright beams of the holder, which hold the input port and the output port in alignment with each other. The refractor is mounted on the rotatable mechanism by adhering to or soldering on the groove of the rotatable mechanism, wherein the rotatable mechanism mates with the through hole of the holder to make the center of the refractor and the optical axis of the input and output collimators of the input and output ports in line.

DETAILED DESCRIPTION OF THE INVENTION

Figure 1:
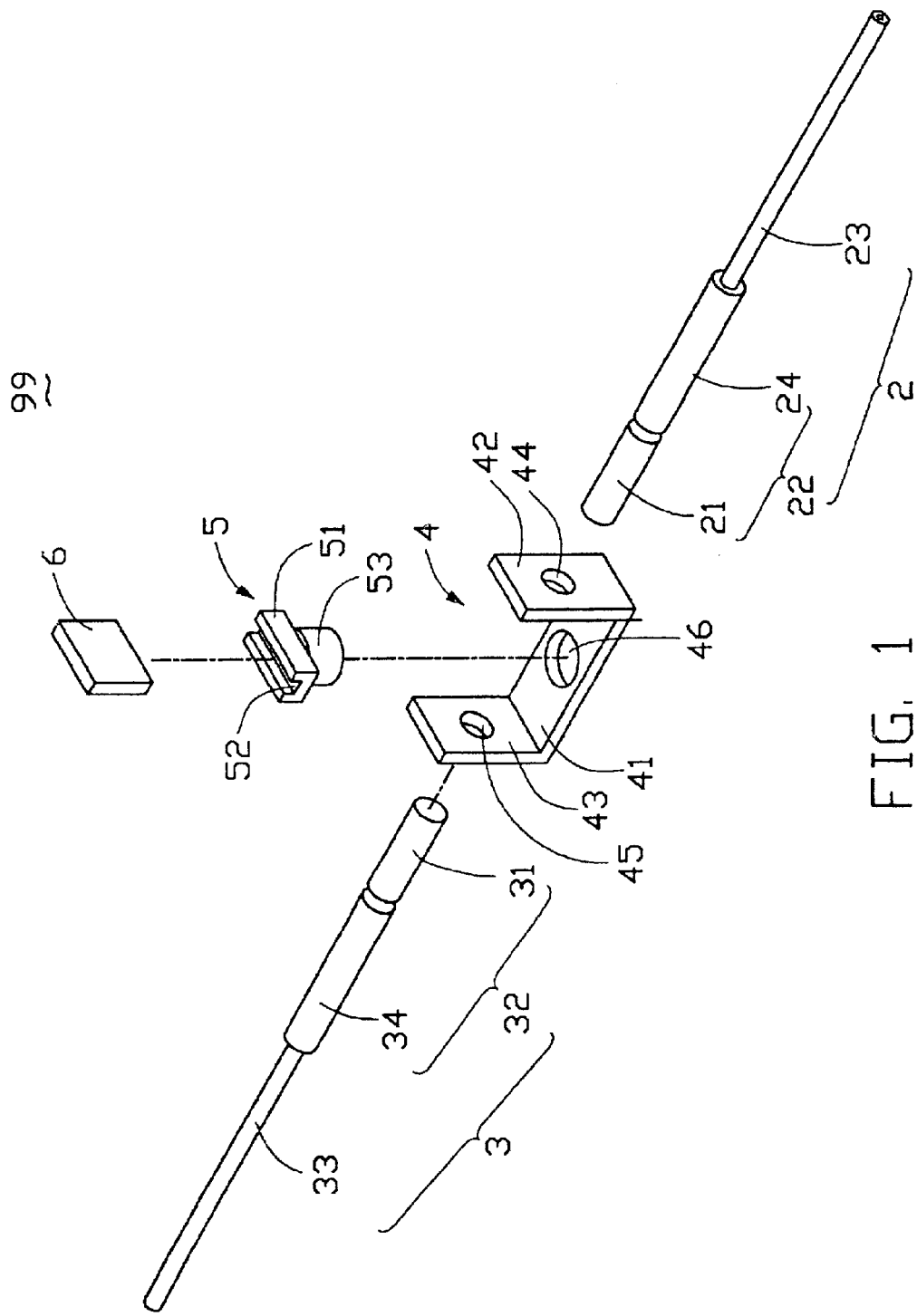
FIG. 1 is an exploded view of a variable optical attenuator of the present invention.
Figure 2:
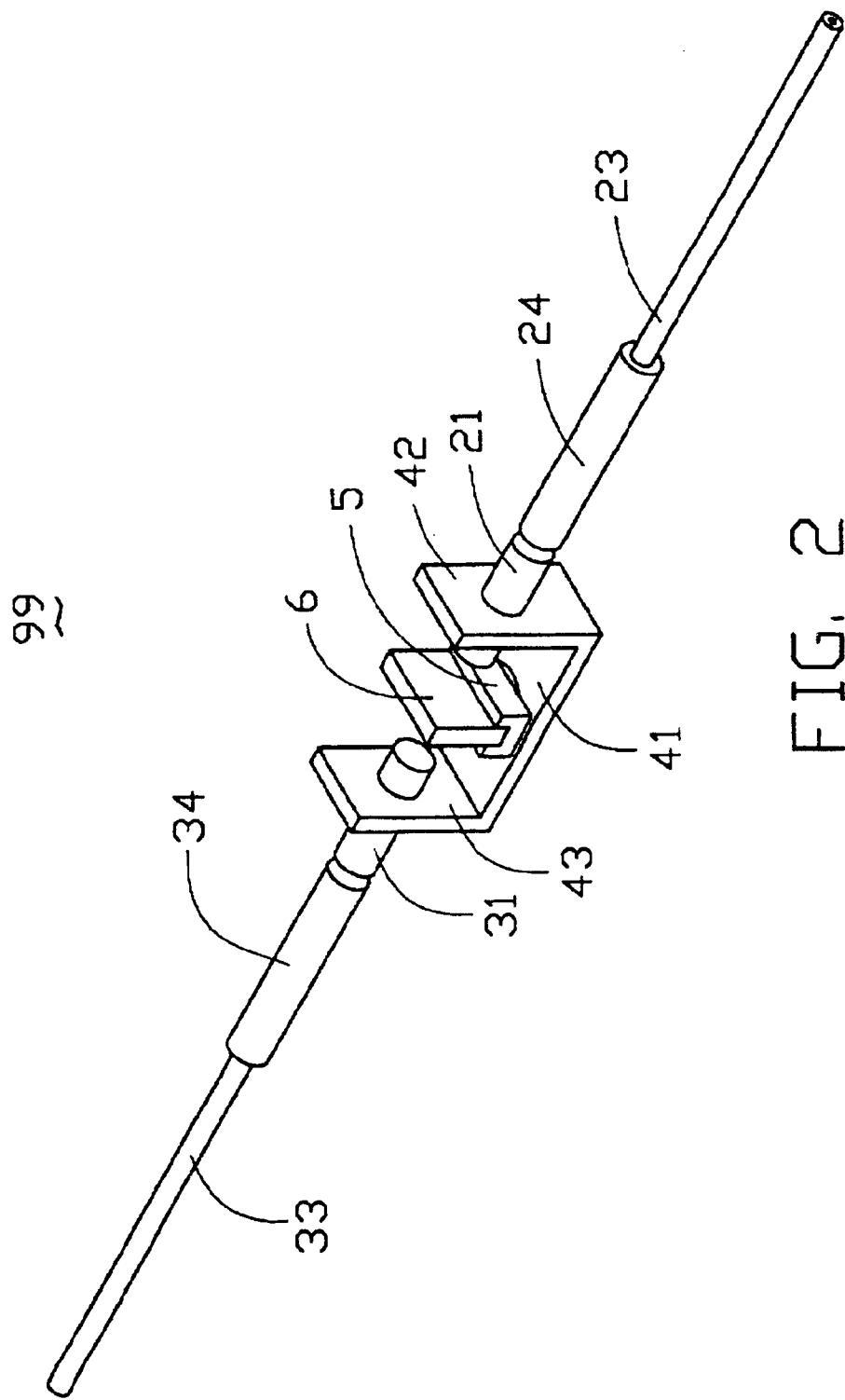
FIG. 2 is a perspective, assembled view of the variable optical attenuator of FIG. 1.

As shown in FIG. 1 and FIG. 2, a variable optical attenuator 99 of the present invention comprises a holder 4, a rotatable mechanism 5, a refractor 6, an input port 2 and an output port 3. The holder 4 includes a base 41 and two upright beams 42, 43 extending upward from two ends of the base 41. A through hole 46 is in the center of the base 41, and two symmetrical mounting holes 44, 45 are on the two upright beams 44, 45, respectively, for fixing the input and output ports 2, 3.

The rotatable mechanism 5 has a fixing block 51 and a rotatable post 53, wherein the fixing block 51 defines a groove 52 in the center of a top surface thereof. The rotatable post 53 extends from the bottom of the fixing block 51 to mate with the through hole 46 of the holder 4. The rotatable mechanism 5 can be driven by an electric motor (not shown) coupling to the rotatable post 53, or by manually turning the rotatable post 53. The electric motor can realize precise adjustment.

In this embodiment, the refractor 6 is a rectangular window lens, which has anti-reflective coatings covering two parallel end faces of the refractor 6 to decrease the return loss.

The input port 2 comprises an input collimator 22 and an input fiber 23. The input collimator 22 expanding the input light beams from the input fiber 23 to parallel light beams contains a ferrule 24 and a graded index lens (GRIN Lens) 21 adhering to the ferrule 24 by epoxy resin, wherein the input fiber 23 inserts into the ferrule 24.

The output port 3 has the same structure to the input port 2, which comprises an output fiber 33 and an output collimator 32 containing a ferrule 34 accommodating the output fiber 33 and a GRIN lens 31 connecting with the ferrule 34 by epoxy resin. The output collimator 32 converges the parallel light beams outputting from the refractor 6.

In assembly, the input port 2 and the output port 3 are engaged with corresponding upright beams 42, 43, which hold the input port 2 and the output port 3 in alignment with each other. The rotatable mechanism 5 holds the refractor 6 by adhering to or soldering on the groove 52, which then mates with the through hole 46 of the holder 4 to make the center of the refractor 6 and the optical axis of the input and output collimators 22, 32 of the input and output ports 2, 3 in line.

Figure 3:
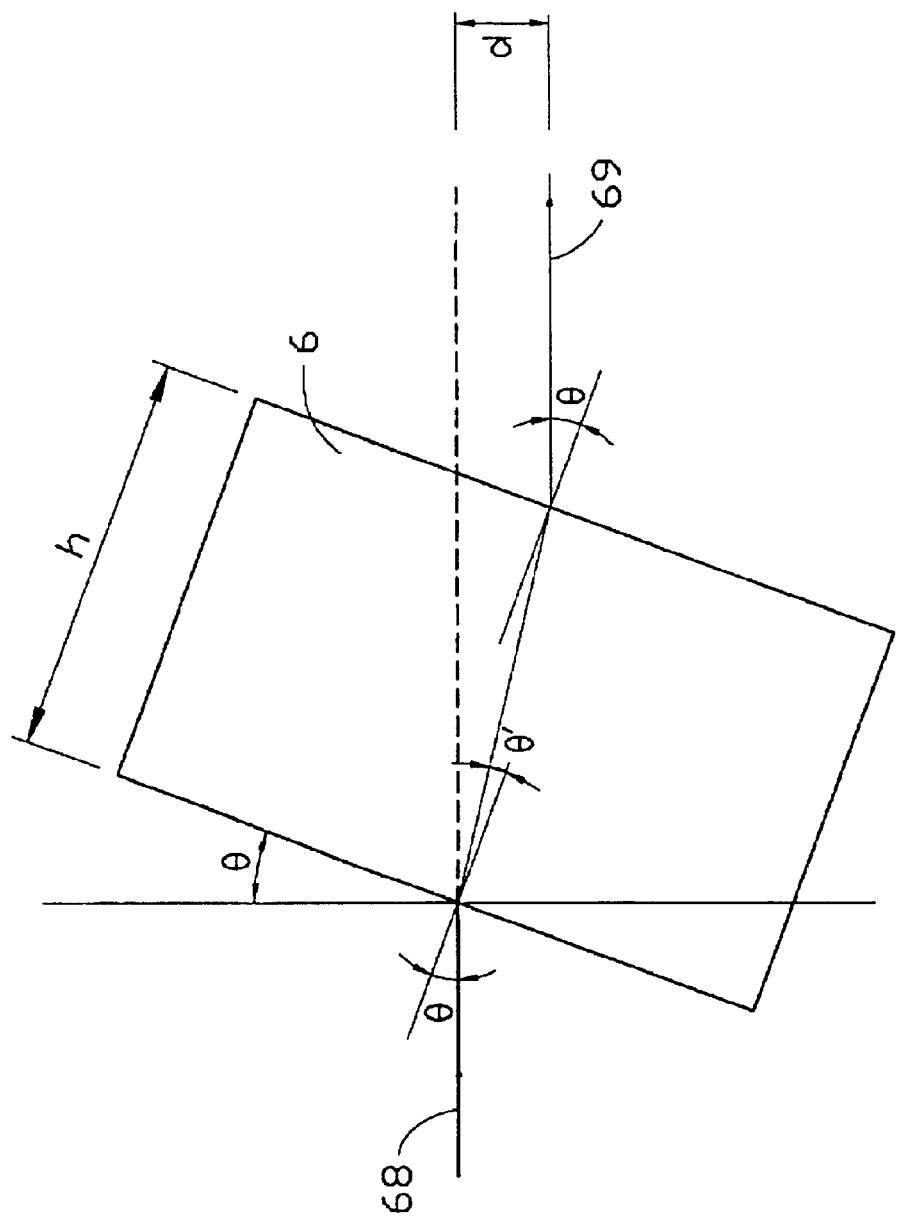
FIG. 3 is a beam trace view in a lens of The variable optical attenuator in FIG. 1.

Referring to FIG. 3, when the refractor 6 rotates θ degrees relative to the optical axis of the input and output collimators 22, 32, input light beams 68 impinge on the end face of the refractor 6 at incident angle of θ degrees and is refracted by the refractor 6. According to the Snell's law, output light beams 69 are parallel to the input light beams 68 and have a lateral deflection (d) relating to the axis of the input beams 68. The deflection (d) is relative to incident angle (θ) by $$d=h\times\sin[\theta-\sin^{-1}(\sin\theta/n)]/\cos[\sin^{-1}(\sin\theta/n)]$$

where h is the thickness of the refractor 6, n is the index of refraction of the refractor 6. An induced attenuation results which is defined by the power loss formula $$A=-10\log\eta$$

where η is lateral displacement effects between the axis of the input beam 68 and the axis of the output beam 69, given by $$\eta=2\times\cos^{-1}(d/a)/\Pi-d\times SQRT[1-(d/2a)^2]/\Pi a$$

where a is the core radius of the optical fibers. When the thickness of the refractor 6 (h), the index of refraction of the refractor 6 (n) and the core radius of the optical fibers (a) is given, the attenuation (A) is only relate to the incident angle (θ) so that a continuous attenuation can be provided by continuously rotating the refractor 6.

Figure 4:
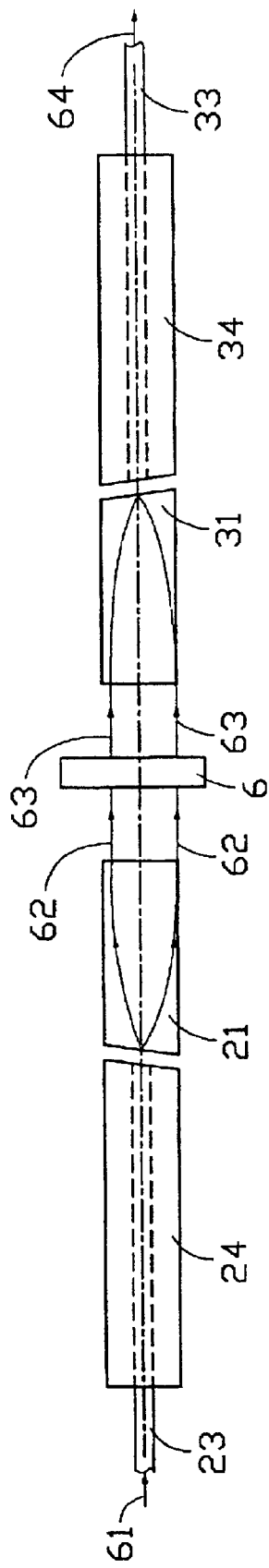
FIG. 4 is a cross-sectional view of optical elements of the variable optical attenuator with the lens orthogonal to the optical path.
Figure 5:
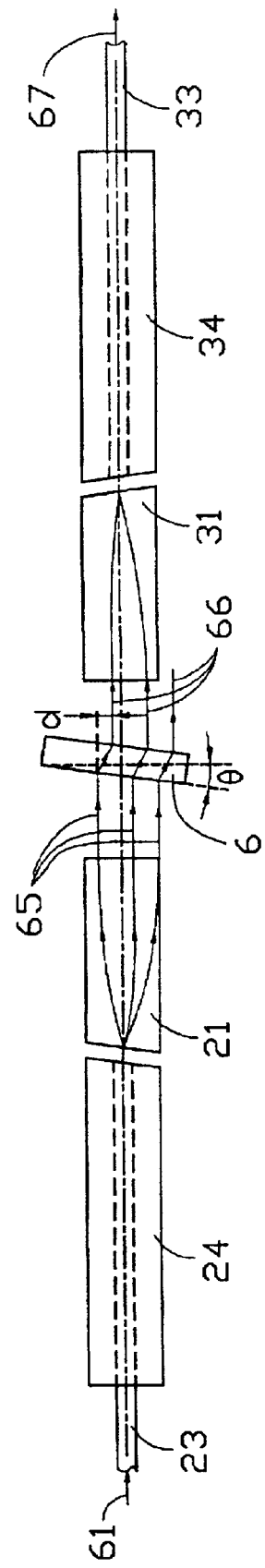
FIG. 5 is a view similar to FIG. 4 but with the lens rotated θ degrees.
Figure 6:
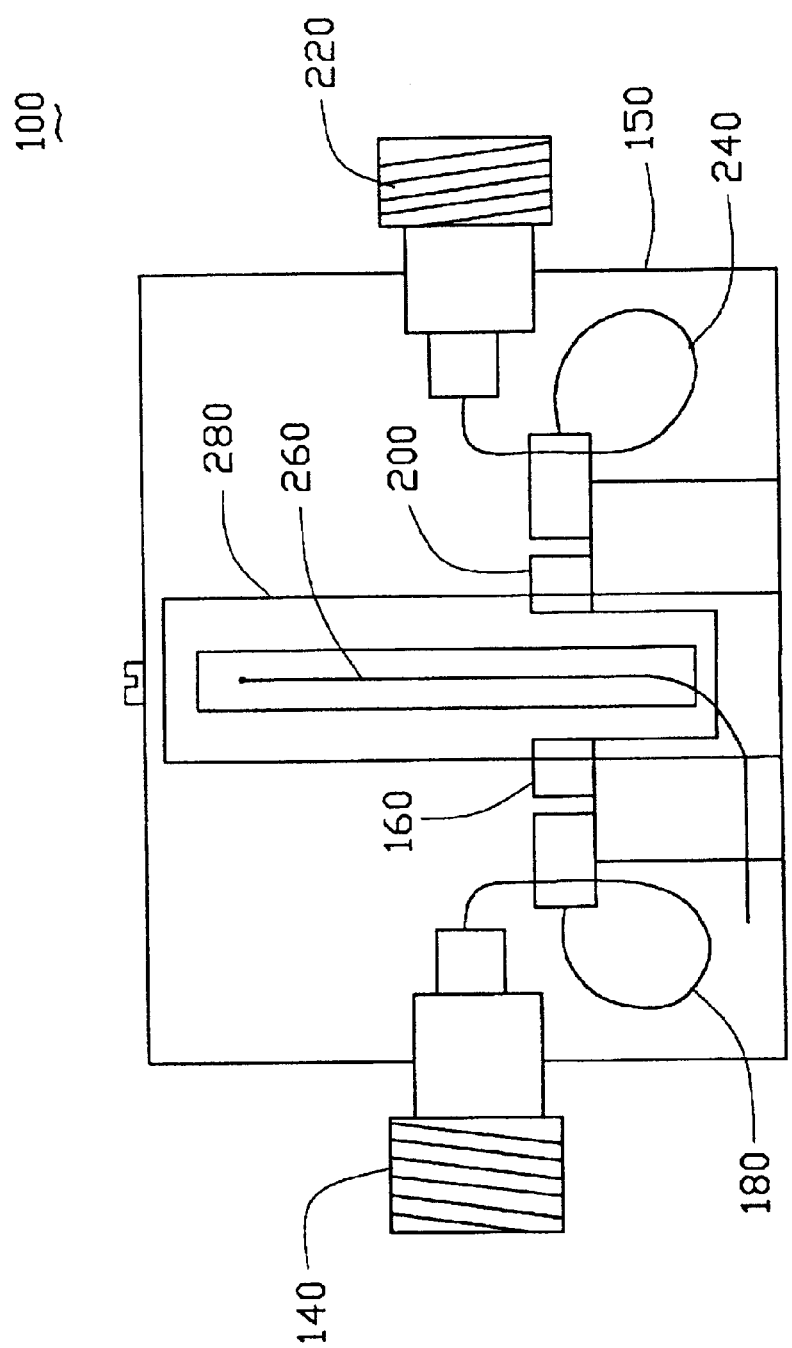
FIG. 6 is a cross-sectional view of a prior art variable attenuator.

FIGS. 4 and 5 show light paths before and after rotation of the refractor 6. In FIG. 4, the refractor 6 is vertical to the optical axis, wherein light beams 61 from the input fiber 23 transmit to the refractor 6 through the input collimator 21, perpendicular to the end face of the refractor 6, and then completely couple to the output collimator 31 at zero incident angle (θ) and zero deflection (d), and finally output by the output fiber 33 through the output collimator 31.

In FIG. 5, the refractor 6 is driven to rotate θ degrees. The refractor 6 deflects output beams 66 from the optical axis of the input beams 65 by refraction when the input beams 65 pass the refractor 6, and then output beams 66 incompletely couple into the output collimator 31, thus attenuation of optical power is realized. Here, The variable optical attenuator 99 can provide a continuously variable attenuation by continuously rotating the refractor 6 different angles about the center of the refractor 6.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A variable optical attenuator for attenuating optical signals transmitted from an input fiber to an output fiber, comprising:

a rotatable mechanism between the input fiber and the output fiber; and a refractor mounted on and being rotatable with the rotatable mechanism which is driven to deflect light beams from the input optical fiber and then to couple part of the light beams into the output fiber, the refractor being rotatable to different angles to change the incident angle of the input light beams and then to output refracted light beams that are deflected from the axis of the input light beams as determined by the incident angle to continuously change the amount of the light beams entering into the output fiber.

2. The variable optical attenuator as claimed in claim 1, further comprising two ferrules for containing the input fiber and the output fiber, respectively.

3. The variable optical attenuator as claimed in claim 1, wherein the rotatable mechanism comprises a fixing block and a rotatable post extending from the bottom of the fixing block.

4. The variable optical attenuator as claimed in claim 1, further comprising a holder to rotatablely hold the rotatable mechanism and hold the two collimators in alignment with each other.

5. The variable optical attenuator as claimed in claim 1, wherein the refractor is a lens.

6. The variable optical attenuator as claimed in claim 5, wherein the refractor has two parallel surfaces.

7. The variable optical attenuator as claimed in claim 6, wherein the refractor has anti-reflective coatings covering the two parallel surfaces.

8. A variable optical attenuator comprising:

an input port and an output port facing to each other along an axial direction, said input port including an input GRIN lens and an input ferrule, said output port including an output GRIN lens and an output ferrule;

a refractor positioned between said input port and said output port, said refractor being rotatable about an axis perpendicular to said axial direction; wherein when said refractor extends perpendicular to said axial direction, light from the input GRIN lens penetrates said refractor and substantially fully enters the output GRIN lens, while when said refractor is tilted relative to the axial direction with therebetween an angle different from ninety degrees, attenuation occurs.

9. The attenuator as claimed in claim 8, wherein said attenuation follows a formula as follows: Attenuation=−10 log η, where η is lateral displacement effect between an axis of the input beam and an axis of the output beam, given by $$\eta=2\times\cos^{-1}(d/a)/\Pi-d\times SQRT(1-(d/2a)^2)/\Pi a \text{ and } d=h\times\sin(\theta-\sin^{-1}(\sin\theta/n))/\cos(\sin^{-1}(\sin\theta/n)),$$

wherein

θ is an incident angle for an input beam from the input GRIN lens with regard to the refractor;

n is an index of refraction;

d is a lateral deflection relative to the axis of the input beam;

a is a core radius of an optic fiber used in the attenuator; and h is a thickness of the refractor.

10. A variable optical attenuator comprising:

an input port;

an output port;

a holder coaxially fixing the input and output ports at two sides thereof;

a refractor positioned between the input and output ports; and a rotatable mechanism mounted in the holder and being rotatable about an axis perpendicular to an optical axis of the input port, said refractor being fixed on the rotatable mechanism.

11. The variable optical attenuator as claimed in claim 10, wherein the rotatable mechanism has a fixing block and a rotatable post extending from a bottom of the fixing block.

12. The variable optical attenuator as claimed in claim 11, wherein the fixing block of the rotatable mechanism has a groove defined in a center of a top surface thereof, for fixing the refractor.

13. The variable optical attenuator as claimed in claim 12, wherein the holder has a base around two side walls respectively perpendicularly extending from two side of the base, and each side wall has a mounting hole defined therethrough for fixing the input port or the output port.

14. The variable optical attenuator as claimed in claim 13, wherein a center hole is defined in a center of the base for mating with the rotatable post of the rotatable mechanism.

15. The variable opitcal attenuator as claimed in claim 14, wherein the refractor has anti-reflective coatings covering two surfaces which respectively face the input and output ports.

* * * * *